L. O'BRIEN.
VEHICLE SIGNAL.
APPLICATION FILED JAN. 19, 1910.

1,001,881.

Patented Aug. 29, 1911.
2 SHEETS—SHEET 1.

WITNESSES:

INVENTOR
Leo O'Brien
BY
Fred B. Tasker,
ATTORNEY

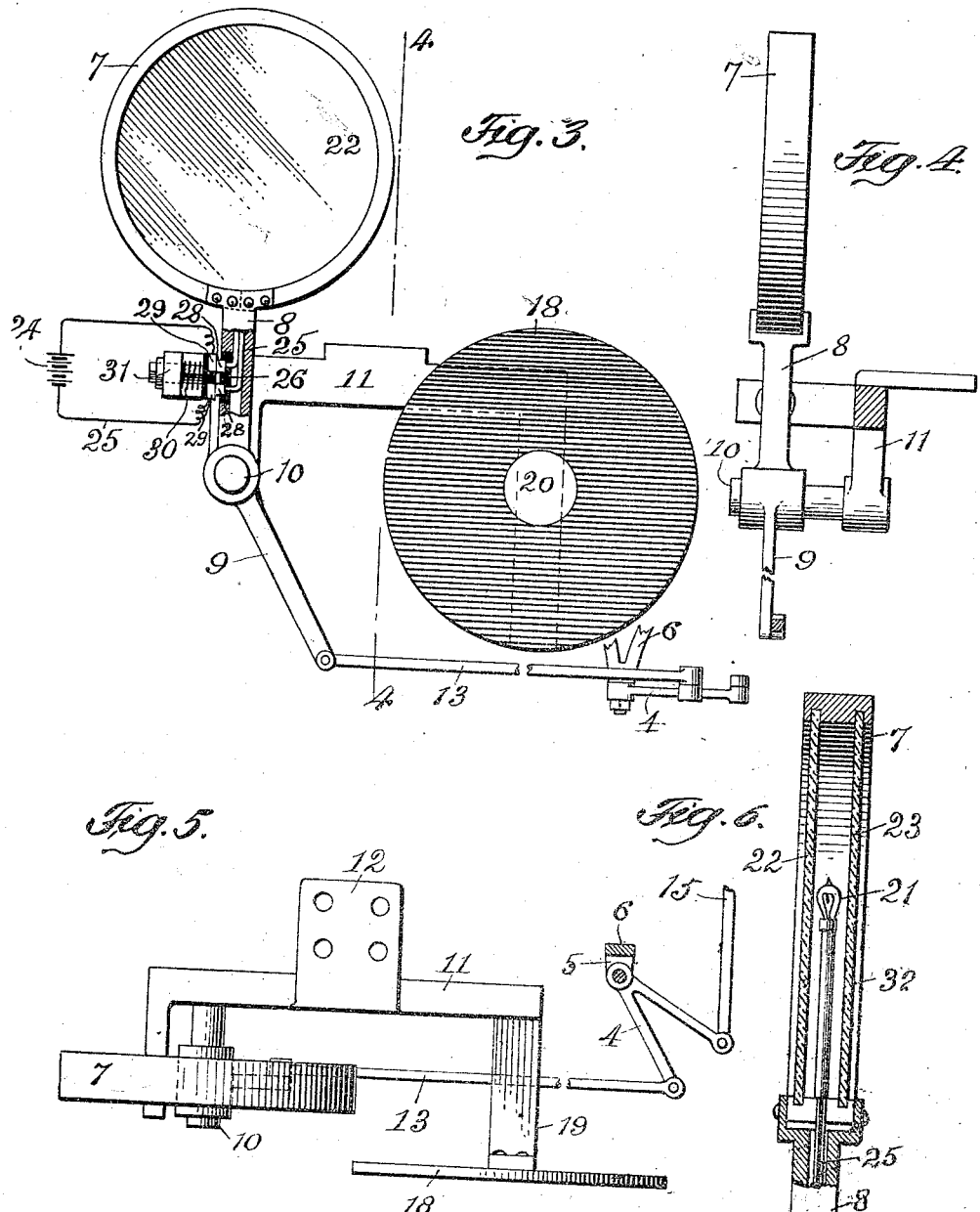

UNITED STATES PATENT OFFICE.

LEO O'BRIEN, OF MONTCLAIR, NEW JERSEY.

VEHICLE-SIGNAL.

1,001,881. Specification of Letters Patent. Patented Aug. 29, 1911.

Application filed January 19, 1910. Serial No. 538,860.

*To all whom it may concern:*

Be it known that I, LEO O'BRIEN, a citizen of the United States, residing at Montclair, in the county of Essex and State of New Jersey, have invented certain new and useful Improvements in Vehicle-Signals, of which the following is a specification, reference being had therein to the accompanying drawing.

This invention relates to rear signals for motor vehicles, whereby the operator operates a semaphore from the front of the car to notify following vehicles that he is about to stop.

The object of my device is to provide superior means for accomplishing the aforesaid purposes.

To this end my invention consists in the peculiar features and combinations of parts more fully described hereinafter and pointed out in the claim.

Figure 1:
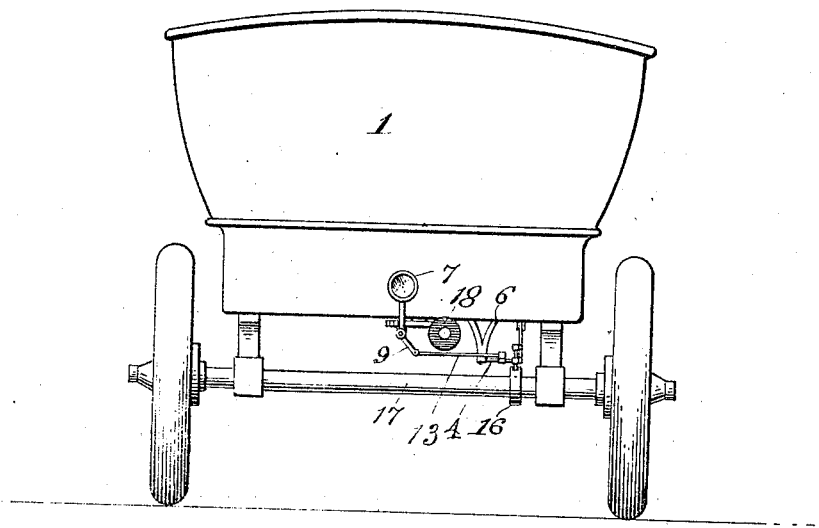
Figure 2:
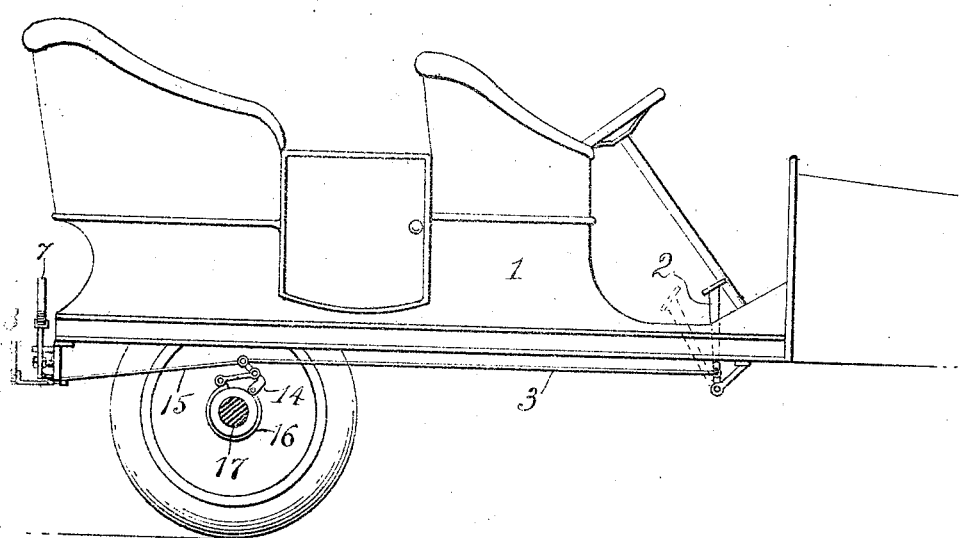

In the accompanying drawings, Figure 1 denotes a rear view of a motor car equipped with my invention. Fig. 2, a side elevation thereof. Fig. 3, an enlarged elevation of the device as in operation. Fig. 4, an edge view of the same. Fig. 5, a top view of the device disconnected from the operating mechanism, and Fig. 6, a vertical section through the illuminated semaphore or signal.

The reference 1 indicates an ordinary motor car to which I prefer to apply my means, although it is well understood that it could be applied with equal force to horse drawn vehicles.

2 indicates an ordinary brake lever adapted to be worked by the foot of the operator of the car. To the lower end of this lever is attached a rod 3 leading back to the rear of the vehicle, and connected with a bell crank lever 4 pivoted on an arm 5 of a bracket 6, secured to the bottom of the vehicle body.

7 represents a signal or semaphore carried on an arm 8 which forms part of an elbow-lever 9 adapted to rock back and forth on a fulcrum 10 projecting from a bracket 11. This bracket 11 is attachable to the under side of the rear portion of the car by a screw-plate 12.

The lever 4 is horizontal and has one arm connected with the elbow-lever 9 by a pull-rod 13, and the other arm connected to a brake mechanism 14 by a rod 15 which is virtually a continuation of draft rod 3, whereby a forward movement of the foot-lever 2 will simultaneously apply a brake 16 on axle 17, and raise the signal 7. When the foot of the operator is released, the signal will fall down into a horizontal position behind an opaque shield 18. This shield is fixed upon the end of a horizontal arm 19 on which the signal rests when it is down.

20 is a colored spot on the outside of the fixed shield 18 to indicate that it is a signal, the remaining surface of the shield being given a different color.

When the signal or semaphore 7 is thrown up into notifying position, as seen in Fig. 3, it will become illuminated by an electric incandescent lamp 21 situated between two glass plates 22 and 23 and electrically connected with a suitable battery 24 by electrical conductors 25 insulated at 26 where the electrical circuit 25 is provided with contact points 28 and 29. The shock of the contacts 28 of the arm 8 with the contact points 29 is cushioned by a coil spring 30 interposed between the contact 29 and a stud 31. The front glass 22 is colored red, and the rear glass is silvered at 32 to provide a reflector for the lamp 21.

From the foregoing description it will be seen that when the operator of the car presses the lever 2 forward from the position shown in dotted lines to that in full lines in Fig. 2, the draft rod 3 will be pulled forward, thereby applying the brake mechanism 14 and simultaneously rocking the bell-crank 4, and elbow-lever 9, and throwing up the signal 7.

Although I have shown one particular form of my invention, it is evident that various other forms, changes, styles and equivalents might be employed without departing from the scope and spirit of my device. Therefore, I wish it understood that I do not limit myself to the exact details herein set forth.

Having thus described my invention, what I claim as new and desire to secure by Letters Patent, is:

In a vehicle signaling device, the combination with a vehicle, of a bracket secured to the rear thereof, formed with a fulcrum pin, a rearward extending arm located at one side of the fulcrum pin and provided at its end with a shield and a stud on the side of the fulcrum pin opposite the said arm, a semaphore pivotally supported on the fulcrum pin and arranged when turned into one position to lie behind the said shield and when turned into another position to rest against the said stud, an electric lighting device carried by the semaphore, electric contact devices supported by the said stud and arranged to co-act with contact devices on the semaphore when the latter rests against the stud, in order to complete the lighting circuit, and means accessible to the operator of the vehicle for moving the semaphore from one of its said positions to the other.

In testimony whereof I affix my signature in presence of two witnesses.

LEO O'BRIEN.

Witnesses:
 R. G. Du Bois,
 C. B. Schroeder.